(12) United States Patent
Mattar et al.

(10) Patent No.: US 9,585,470 B2
(45) Date of Patent: Mar. 7, 2017

(54) POSITION-ADJUSTABLE SUPPORT ASSEMBLY

(71) Applicant: JORO Manufacturing Company Ltd., Airdrie (CA)

(72) Inventors: Johnny Mattar, Calgary (CA); Jamil Mattar, Calgary (CA)

(73) Assignee: JORO Manufacturing Company Ltd., Airdrie (CA)

( * ) Notice: Subject to any disclaimer, the term of this patent is extended or adjusted under 35 U.S.C. 154(b) by 0 days.

(21) Appl. No.: 14/624,080

(22) Filed: Feb. 17, 2015

(65) Prior Publication Data
US 2015/0230606 A1     Aug. 20, 2015

Related U.S. Application Data

(60) Provisional application No. 61/941,773, filed on Feb. 19, 2014.

(51) Int. Cl.
*A47G 29/02* (2006.01)
*A47B 51/00* (2006.01)

(52) U.S. Cl.
CPC .................................... *A47B 51/00* (2013.01)

(58) Field of Classification Search
CPC .................................................... A47B 51/00
USPC ........... 248/200.1, 201, 231.91, 244, 295.11, 248/297.11, 297.21, 327, 550
See application file for complete search history.

(56) References Cited

U.S. PATENT DOCUMENTS

| | | | | |
|---|---|---|---|---|
| 6,286,794 B1* | 9/2001 | Harbin | ................... | A47B 21/02 248/123.2 |
| 6,398,149 B1* | 6/2002 | Hines | .................... | A47B 21/06 242/388.6 |
| 6,783,105 B2* | 8/2004 | Oddsen, Jr. | ........... | F16M 11/04 248/279.1 |
| 7,063,296 B2* | 6/2006 | Williams | ............... | F16M 11/04 248/244 |
| 7,410,143 B2* | 8/2008 | Chen | ..................... | F16M 11/04 248/176.3 |
| 7,845,607 B2* | 12/2010 | Matthiessen | ............. | B23Q 1/28 248/229.12 |
| 8,191,487 B2* | 6/2012 | Theesfeld | .............. | A47B 57/06 108/106 |
| 8,567,735 B2* | 10/2013 | Burgess | ................. | F16M 11/04 248/280.11 |
| 2010/0096527 A1* | 4/2010 | Brown | ................... | A47B 51/00 248/295.11 |

* cited by examiner

*Primary Examiner* — Gwendolyn Baxter
(74) *Attorney, Agent, or Firm* — Dickinson Wright PLLC

(57) ABSTRACT

A position-adjustable support assembly comprises at least one surface mount, an actuator affixed thereto, and a body coupled to and supported on the actuator free of the at least one surface mount. The body is moveable relative to the at least one surface mount in response to a motive force applied by the actuator. The actuator may be affixed to the at least one surface mount inboard of an outer perimeter defined by a frame portion of the body so as to be accommodated interstitially between the at least one surface mount and the body. In some embodiments, the support assembly may further comprise a strain gauge, coupled to the body at a terminal region thereof, which may be configured to detect a strain force acting on the body in the terminal region and control movement of the body based on the strain force detected by the strain gauge.

28 Claims, 5 Drawing Sheets

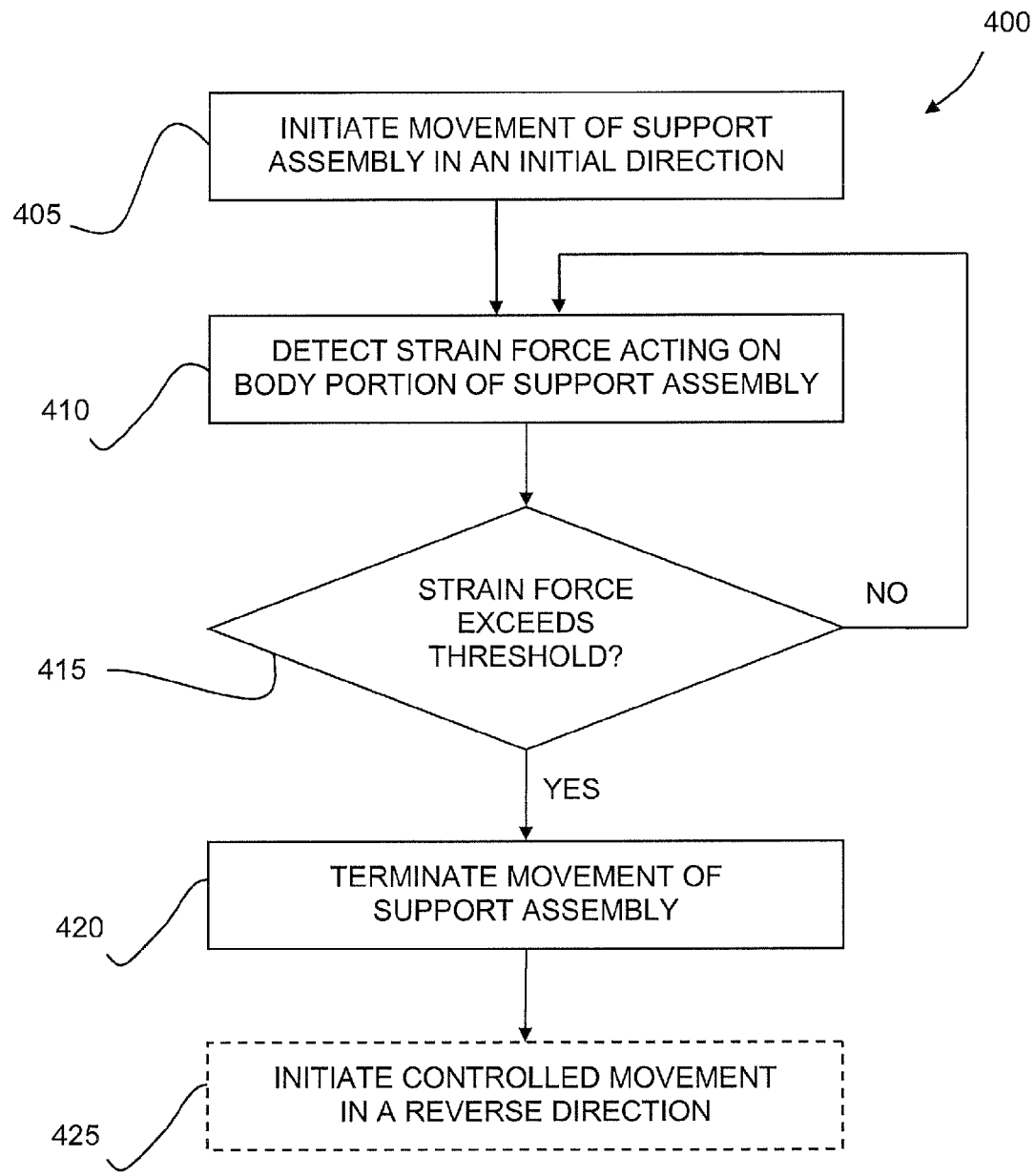

POSITION-ADJUSTABLE SUPPORT ASSEMBLY

CROSS-REFERENCE TO RELATED APPLICATIONS

This application claims all right and benefit of U.S. provisional application Ser. No. 61/941,773, filed Feb. 19, 2014, the entire contents of which are herein incorporated by reference.

TECHNICAL FIELD

The disclosure relates generally to a support assembly for mounting of cabinetry, shelving or other types of storage units and, more specifically, to a support assembly that is position-adjustable to facilitate access thereto.

BACKGROUND

Wall-mounted storage units, such as cabinets and shelving, are utilized in many houses or other buildings as a way to organize items and to make better and/or more efficient use of available floor space by removing such items from the or other floor-based storage units. In some arrangements, wall-based storage units can be mounted in close proximity to other fixtures, installations and/or furnishings, such as counters, tables, bookcases, washer-dryer combinations, and the like. Typically, in such cases, the wall-mounted storage unit will be positioned at a height that accommodates the floor-based structure(s) and which provides sufficient clearance that different intended uses of these various floor-based structure(s) may be made.

Depending on the height and/or size of the floor-based structure, the wall-mounted storage units may be positioned at a height that is comparable to, or which even exceeds, the average height of a person. Consequently, depending on the height of the person, gaining access to all parts of the wall-mounted storage unit may pose some difficulty. For example, it is common to be able to reach lower areas of a cabinet or shelf without any physical aids, such as chairs or stools, but to require the use of such aids when attempting to access higher areas. Difficulty in accessing all areas of the storage units without the use of physical aides can limit their functionality.

For able-bodied persons, use of a physical aid to access the higher parts of a wall-mounted storage unit may not pose any risk or present much inconvenience. However, not all persons have the same physical attributes. Some people are shorter in stature; others have physical limitations whether due to age, medical condition, or for any other reason. Standing on a physical aid to reach the upper areas of a wall-mounted storage unit may therefore not be desirable or even possible for some.

SUMMARY

In at least one broad aspect, there is provided a position-adjustable support assembly comprising at least one surface mount, an actuator affixed to the at least one surface mount, and a body that includes a frame portion coupled to and supported on the actuator free of the at least one surface mount, such that the body, in response to a motive force applied by the actuator, is moveable relative to the at least one surface mount. The actuator is further affixed to the at least one surface mount inboard of an outer perimeter defined by the frame portion so as to be accommodated interstitially between the at least one surface mount and the body.

In at least one other broad aspect, there is provided a position-adjustable support assembly comprising at least one surface mount, an actuator fixedly secured to the at least one surface mount, and a body coupled to and supported on the actuator free of the at least one surface mount, such that the body, in response to a motive force applied by the actuator, is moveable relative to the at least one surface mount. The position-adjustable support assembly further includes a strain gauge coupled to the body at a terminal region thereof and configured to detect a strain force acting on the body in the terminal region. The actuator is in communication with the strain gauge and configured, when operative, to control movement of the body based on the strain force detected by the strain gauge.

In at least one other broad aspect, there is provided a method of controlling movement of a position-adjustable support assembly. The method may include initiating movement, relative to at least one stationary anchor point, of a body portion of the position-adjustable support assembly, detecting a strain force acting on a terminal region of the body portion, and controlling movement of the body portion based on the strain force detected in the terminal region.

Further details of these and other aspects of the described embodiments will be apparent from the detailed description to follow below.

BRIEF DESCRIPTION OF THE DRAWINGS

To describe various different embodiments of an invention or multiple inventions, including at least one preferred embodiment thereof, reference will be made herein throughout to the accompanying drawings, in which:

FIG. 4 is a flow chart depicting a method of operating an embodiment of a support assembly.

For clarity and ease of description, like reference numerals will be used in the drawings to denote like parts of the described embodiments.

DETAILED DESCRIPTION

Figure 1A:
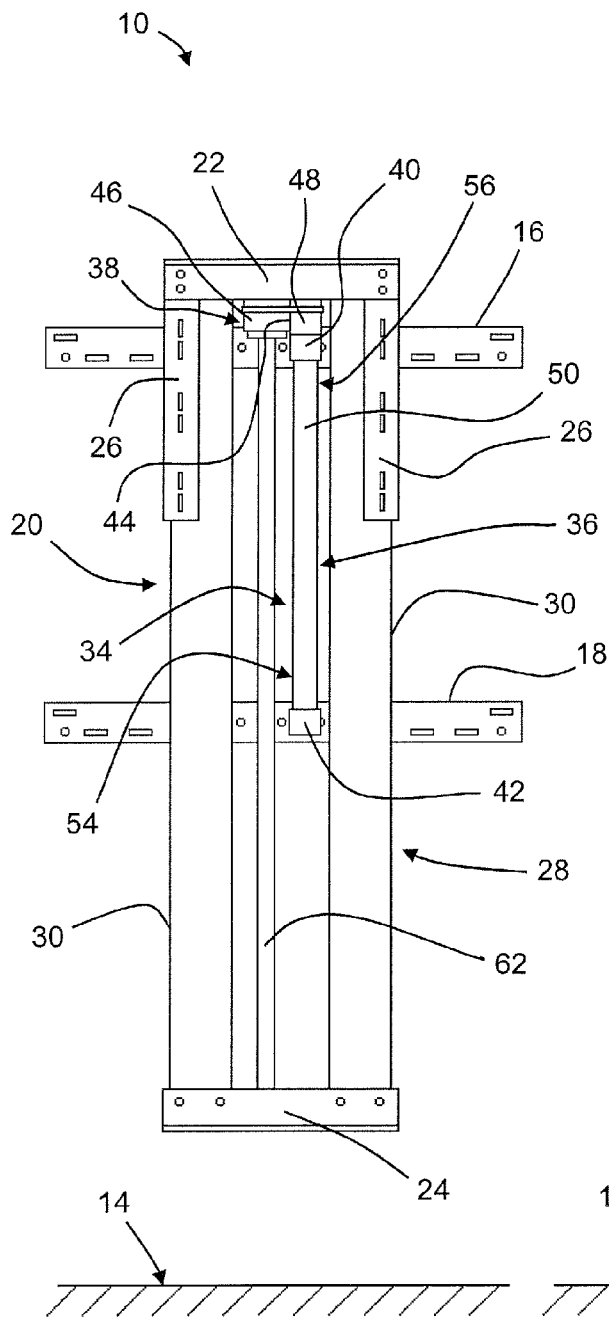
FIGS. 1A and 1B show, in front and partial cut-out side view, respectively, an embodiment of a support assembly in a lowered position.

Embodiments of the invention(s) described herein provide a support assembly that is mountable onto flat or generally flat surfaces, such as interior walls and facades of houses or other buildings, which have a vertical or generally vertical profile. Once mounted to such a surface, one or more different types of configurations of storage units, such as cabinetry and/or shelving, as well as combinations thereof, may then themselves be mounted onto and supported by such an assembly. Thus, among other potential uses, a support assembly having this configuration may provide a mechanism for mounting storage units onto various surfaces that are compatible with at least this one particular use.

As described herein, embodiments of a support assembly may be provided with mechanics and related structural components that allow for the support assembly to be position-adjustable. For example, with use of a suitable actuator (examples of which are described), one or more different components of a support assembly may be capable of movement through a range of motion in order to place one or more storage units mounted thereon at correspondingly different physical positions or locations. In some embodiments, such an actuator may be configured for linear movement so that such storage units may correspondingly be movable through a linear range of movement. The orientation of the actuator may also be such that the linear range of movement experienced by the storage units is vertical or generally vertical. Thus, configured in this fashion, a support assembly and the storage units(s) mounted thereon may, in particular, but without limitation, be height-adjustable.

In some embodiments, a position-adjustable support assembly may be provided in which all or substantially all mechanical components of an actuator used in the support assembly to generate motive force are concealed from view. For example, such mechanical components may be fastened to the support assembly in location(s) that will be substantially entirely covered by the storage unit(s) to be mounted thereon. Consequently, from a wide or even complete range of viewing angles, and over the entire movable range of the support assembly, the storage unit(s) mounted on the support assembly may conceal the actuator and therefore appear as conventionally mounted storage units. Concealment of the mechanical components that provide motive force may imbue the mounted storage unit(s) with a pleasing or desirable aesthetic quality compared to other possible configurations of position-adjustable support assemblies in which no or incomplete concealment of an actuator is achieved.

In some embodiments, a position-adjustable support assembly is also provided having a feedback mechanism for detection and mediation of obstructions during operation. For example, when a movable support assembly is being raised or lowered, the storage unit(s) mounted thereon may encounter obstructions or other objects in their path of movement, depending on their proximity to other fixtures, furnishings, and/or installations (e.g., as in the case of a storage unit mounted so as to overhang a table or countertop on which rests a vase or bottle). If no mechanism to detect these obstructions is in place, continued movement of the support assembly despite the obstruction may cause damage to the encountered object or even to the support assemblies. Thus, a feedback mechanism to both detect and mediate such obstructions may be incorporated into a position-adjustable support assembly. With such a feedback mechanism installed, when an obstruction is encountered during movement of the support assembly, an automated control response may be initiated to override user control of the support assembly and thereby mediate the obstruction.

Figure 1B:
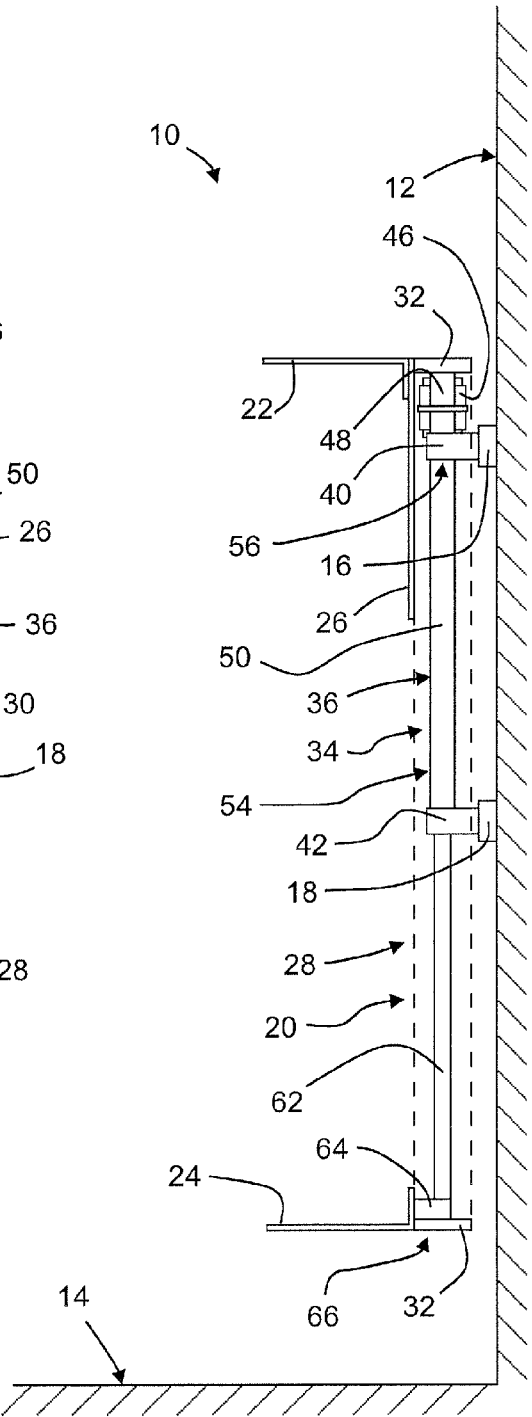
Figure 2A:
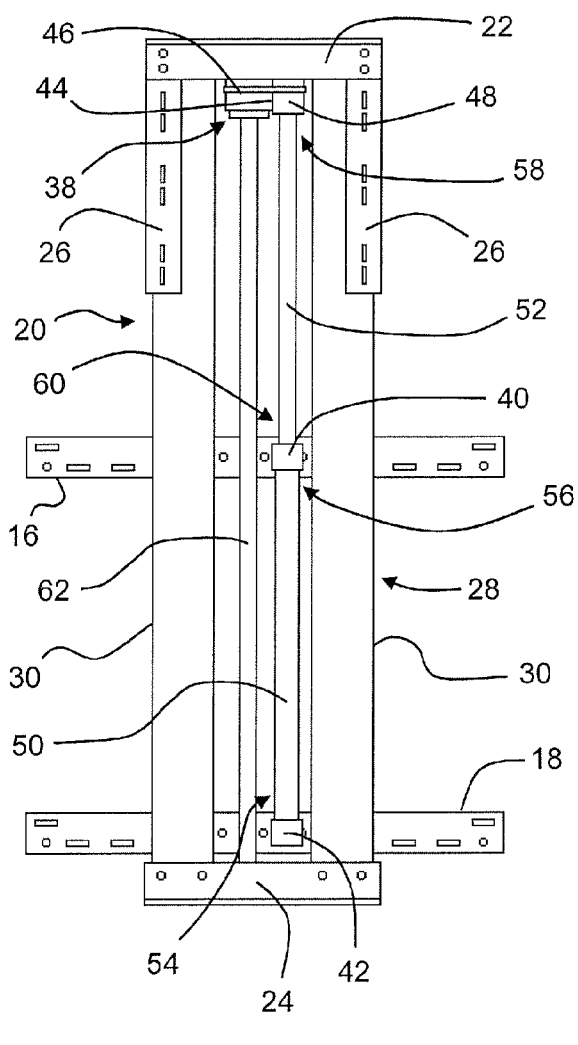
FIGS. 2A and 2B show in front and partial cut-out side view, respectively, an embodiment of a support assembly in a raised position.
Figure 2B:
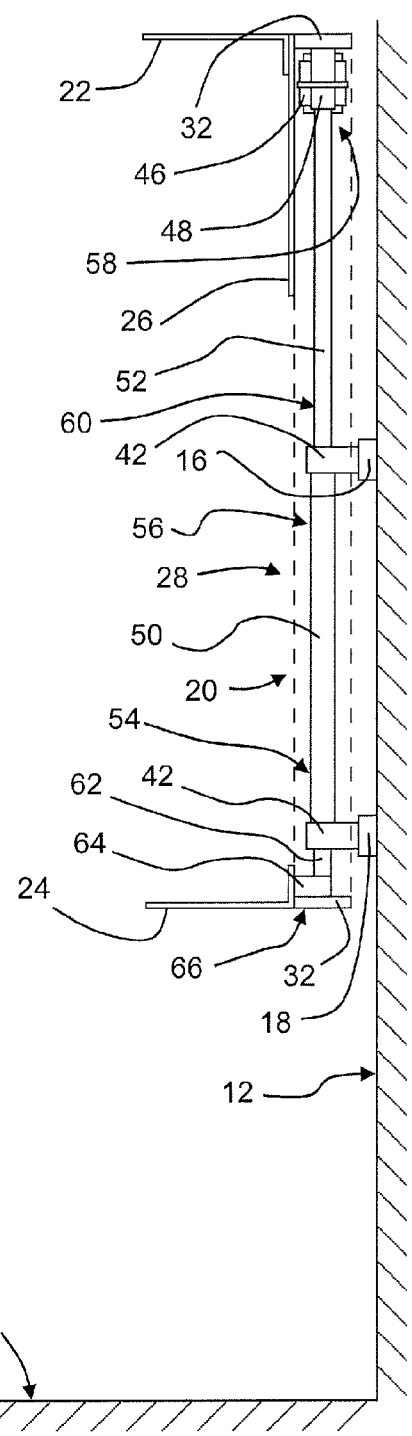

Referring now to FIGS. 1A and 1B, there are shown different views of an example embodiment of a support assembly, denoted generally as 10, according to the invention(s) set forth and described herein. Support assembly 10 is mounted to wall 12, which is more or less flat and vertically oriented, by a distance offset from floor 14, which is more or less flat and horizontally oriented. The support assembly 10 in FIGS. 1A and 1B is shown in a fully downward position at which there is still clearance between the lowest part of the assembly 10 and the floor 14. In FIGS. 2A and 2B, described more fully below, support assembly 10 is shown in a fully upward position and the clearance to floor 14 is greater (FIGS. 3A and 3B also show side-by-side views of support assembly 10 in the fully upward and downward positions to highlight the full range of motion).

The height at which support assembly 10 is mounted above floor 14 is variable depending on use, preference, etc., but generally will be such that some clearance is preserved when support assembly 10 is in the fully downward position. For example, in some cases, support assembly 10 may be mounted above a fixture (countertop, washing machine/dryer, etc.) or furnishings (tables, cabinets, bookcases, etc.) at a height that accommodates such fixtures and/or furnishings in a useful manner. In other cases, support assembly 10 may be not mounted above anything and will therefore only preserve clearance to floor 14. User preference, aesthetics, and other considerations may also influence the mount height of assembly 10.

One or more surface mounts may be used in order to fasten support assembly 10 to wall 12. Two such surface mounts are shown in FIGS. 1A and 1B, including a first surface mount 16 and a second surface mount 18 spaced vertically apart from the first surface mount 16. In the example configuration, each surface mount 16, 18 is a generally horizontally oriented bracket that may be fastened to wall 12 using suitable mechanical fasteners, such as screws, bolts, or nails. First surface mount 16 is positioned closer to a "top" end of support assembly 10, while second surface mount is positioned closer to a "bottom" end thereof. However, any reference here or elsewhere in the description to absolute directions or orientations, such as "horizontal", "vertical", "top", or "bottom", is made only for ease of description taking into account the example configurations presented, and that such references may also denote relative positions and/or orientations both within support assembly 10 and in the context of reference points that are exterior to support assembly 10.

While two surface mounts 16, 18 are shown, other numbers, types, and/or configurations and orientations of surface mounts may be possible in alternative embodiments. For example, in some cases, one or more surface mounts in addition to surface mounts 16,18 may be utilized; in other cases, only a single surface mount, such as a vertically oriented elongate or rectangular bracket, may be possible as well. The orientation of such surface mounts may also be varied and is not limited just to the generally horizontal configuration shown. In general, any number and configuration of surface mounts that securely fastens support assembly 10 to wall 12 and provides an attachment point or points for an actuator (explained further below) may be used in different embodiments.

Support assembly 10 further includes a body portion 20 onto which one or more different storage units, e.g., combinations of cabinetry and/or shelving (not shown) may be fastened. In FIGS. 1A and 1B, upper end bracket 22 and lower end bracket 24 may provide attachment points for the storage unit(s), although different attachment mechanisms, including adhesives and other mechanical or chemical bonds may be used, either in addition to or in replacement of mechanical fasteners. The number, type, and/or position of fasteners may generally depend on the number and/or type of storage units being mounted. For example, one or more side brackets 26 adjacent to upper end bracket 22 may also be included. The particular configuration shown may be suitable to mount a cabinet comprised of a vertical stack of closed-in shelves, while a different configuration of fasteners to what is shown may be utilized to mount shelving or cabinets having a generally horizontal (as opposed to vertical) profile, provide that the selected configuration of fasteners has sufficient strength and structural integrity to maintain the weight of the mounted storage unit(s).

In some embodiments, the body portion 20 of support assembly 10 may include a perimeter frame 28 that provides the body portion 20 with structural stability so as to support the weight of mounted storage unit(s). Perimeter frame 28 may be a single integral body or, as shown, a composite of two or more fastened components. Thus, for example, perimeter frame 28 may include a pair of legs 30, spaced apart from and running parallel to one other, generally longitudinally of body portion 20. To maintain the legs 30 in spaced apart relation, one or more transverse bridges 32 or end caps may also be included in body portion 20. The number, configuration, and location of spacing elements for legs 30 in general may vary. However, as explained, the geometry of perimeter frame 28 cooperates with surface mounts 16, 18 to define an interior or interstitial space into which a suitably configured actuator for (e.g., linear) movement of body portion 20 may be accommodated. Thus, when a storage unit(s) is mounted onto body portion 20, such an actuator may be substantially concealed from view behind the storage unit(s) in between the spaced apart legs 10 and the surface mounts 16, 18.

Thus, support assembly 10 may also in some embodiments include an actuator 34 that is mounted onto surface mounts 16, 18 inboard of, and accommodated within the interstitial space defined by, perimeter frame 28. For example, when perimeter frame 28 includes legs 30 running generally longitudinally in spaced apart relation, actuator 34 may be shaped to also have a generally elongated profile that fits laterally between spaced apart legs 30 and which has a depth that does not exceed or approximately equals the depth of spaced apart legs 30. When accommodated within the interstitial space defined by perimeter frame 28, for example, actuator 34 may thereby be totally concealed when support assembly 10 is viewed from a straight on perspective (as in FIGS. 1A and 2A) as well as a range of other viewing angles.

Actuator 34 may comprise one or more different mechanical and/or electrical components that together generate and apply a motive force to body portion 20 so as to induce controllable movement thereof. Thus, through operation of actuator 34, body portion 20 may be capable of one or more different types of movement, such as linear or planar motion, so as to be movable through a range of different positions. In some cases, actuator 34 may be configured to apply a linear motive force to body portion 20, which thereby may undergo a generally linear range of motion. When support assembly 10 is oriented vertically, this linear range of motion may translate generally to upwards and downwards motion of body portion 20.

So that body portion 20 may be movable in response to motive force generated by actuator 34, in some embodiments, actuator 34 may be fixedly secured or fastened onto the at least one surface mount 16,18, and body portion 20 may be coupled to and supported on actuator 34 free of the at least one surface mount 16, 18. With this configuration, from the perspective of surface mounts 16, 18 (also wall 12), which behave as relatively static elements, body portion 20 through its coupling to actuator 34 appears to be floating and therefore is responsive to applied motive force. When the actuator 34 is actively generating and applying motive force, body portion 20 is movable in relation to the static surface mounts 16, 18.

Because body portion 20 is supported on actuator 34 free of surface mounts 16, 18, in addition to having a profile that may be accommodated within the space defined by frame portion 28, actuator 28 is also provided with a configuration that has sufficient structural integrity to support the weight of body portion 20. Thus, actuator 34 may be formed out of relatively high strength materials and components so as to be robust and durable. As described further below, the configuration of actuator 34 in relation to other elements of support assembly 10 may be that actuator 34 remains in a constant or nearly constant compressive (as opposed to tensile) state. Thus, whether actuator 34 is moving or holding steady the position of body portion 20, the force transfer between actuator 34 and body portion 20 is such that actuator 34 experiences compressive forces. In comparison to tensile forces, compressive forces may tend to cause less component wear over time as well as facilitate more reliable and robust control responses, among other potential advantages and/or benefits.

Accordingly, in some embodiments, as seen in FIGS. 1A and 1B, actuator 34 may comprise a rigid mechanical arm 36 and a controllable drive system 38 that is operatively coupled to the arm 36 and capable of generating motive force. Arm 36 may be fixedly secured or otherwise fastened to one or more surface mounts 16, 18. In the configuration shown, with at least two vertically spaced apart surface mounts 16 and 18, arm 36 may be secured to each surface mount 16, 18 at respective anchors 40, 42, in a consequently also vertical or generally vertical orientation. The strength and/or rigidity of arm 36 as well as anchors 40, 42 will be such that the weight of body portion 20 with storage unit(s) mounted can be supported. For example, metals and other high strength composite materials, such as carbon fibers, may be suitable. As surface mounts 16, 18 (from at least the perspective of body portion 20) appear as stationary points, anchors 40, 42 may therefore also behave like stationary points within support assembly 10.

Drive system 38 may be coupled to arm 36 by way of a suitable mechanical interface or joint 44 that effects transfer of motive force therebetween. To generate motive force, drive system 38 may include a motor 46 that produces any one or a combination of mechanical, electromechanical, hydraulic, or other types of force motive. For example, in some embodiments, motor 46 may be an electrical motor that is hydraulically interfaced with arm 36 or alternatively by way of gearing and/or other force transfer elements. However, different embodiments may also utilize a different drive system 38 and/or corresponding interface 44 as the case may be.

To transfer motive force generated by drive system 38 into body portion 30, mechanical arm 36 may also be coupled to perimeter frame 28 at anchor 48. For example, anchor 48 may form a joint at an inner face of transverse bridge 32 that opposes an end of arm 36. Being a rigid body, when mechanical arm 36 is moved under the control of drive system 38, motive force originated from drive system 38 is transferred from arm 36 into body portion 20 through anchor 48. Thus, like anchors 40, 42, anchor 48 may also be any mechanically stable and rigid joint, whether permanent or releasable, as may be provided by fasteners, bonds, adhesives, and/or others.

Referring now also to FIGS. 2A and 2B, mechanical arm 36 has a configuration that, under the controlled influence of drive system 38, induces movement of body portion 20 in relation to surface mounts 16,18. In the configuration shown, arm 36 is movable through a plurality of different states or positions, including at least retracted and extended states or positions, as well as a range of intermediate states of extension/retraction. Through transfer of motive force, extension and retraction of the arm 36 causes corresponding movement (in this case linear) of body portion 20. Given the orientation of support assembly 10 on wall 12, such linear movement is essentially in a vertical up-and-down direction, although different orientations of support assembly 10 would produce correspondingly different motion. In FIGS. 2A and 2B, arm 36 is fully extended and body portion 20 is therefore at a maximum height in relation to stationary surface mounts 16, 18 and floor 14; FIGS. 1A and 1B show arm 36 fully retracted and body portion 20 at a corresponding minimum height.

As can be seen in FIGS. 2A and 2B, in some embodiments, arm 36 may comprise a number of different components, including at least a stationary arm portion 50 and a mobile arm portion 52. Each of the arm portions 50, 52 may have rigid generally elongate geometries, for example, with stationary arm portion 50 having a hollow cylindrical shape and mobile arm portion 52 also cylindrical and sized so as to be accommodated radially within stationary arm portion 50. Thus, mobile arm portion 52 is movably (e.g., slidably or rollably) supported within stationary arm portion 50 in collinear alignment therewith (as seen, e.g., in FIGS. 1A and 1B where mobile arm portion 52 has been retracted completely or almost completely into stationary arm portion 50). Together, arm portions 50, 52 therefore behave like a single telescoping arm. For greater certainty, as used herein throughout, the term "cylindrical" and its equivalents does not imply any one particular cross-sectional profile, such as circular, but may refer generally to any extruded or elongate body of whatever profile, including square and rectangular in addition to circular profiles.

Stationary arm portion 50 of arm 36 may be fixedly attached across the pair of surface mounts 16, 18 (or across different portions of a single surface mount if only one surface mount is included in support assembly 10). For example, in relation to drive system 38, stationary arm portion 50 may be fixedly attached to surface mount 18 by way of anchor 42 located at a distal end portion 54 of stationary arm 50. Likewise stationary arm portion 50 may be fixedly attached to surface mount 16 by way of anchor 40 located at a proximal end portion 56 of stationary arm 50. As used herein throughout, the term "fixedly attached" denotes a mechanically stable joint that prevents or effectively presents the two joined bodies from relative movement in respect of one another, but does not necessarily imply joints that are breakable only through complete or partial destruction of the joints; both permanent and releasable or refastenable joints may provide "fixed attachment".

Mobile arm portion 52 of arm 36 may be fixedly attached to body portion 20 by way of anchor 48 located (again relative to drive system 38) at a proximal end portion 58 of mobile arm 52. As described above, anchor 48 may couple body portion 20 at any convenient attachment area of perimeter frame 28, such as an inwardly facing surface of transverse bridge 32. A distal end portion 60 of mobile arm 52 may be coupled to stationary arm portion 50 through friction fit or some other coupling allows mobile arm portion 52 to move (e.g., slide, roll) into and out of stationary arm portion 50 under the control of drive system 38.

The respective lengths of the mobile and stationary arm portions 50, 52 are variable, but in some embodiments may be equal or approximately equal to provide a compact arrangement within support assembly 10. In some cases, the length of each individual arm portion 50, 52 does not exceed approximately half the longitudinal length of perimeter frame 28, so that (as seen in FIGS. 2A and 2b) even at maximum extension, the total length of arm 36 does not exceed the length of the perimeter frame 28. In other cases, the length of each individual arm portion 50, 52 may exceed approximately half the longitudinal length of perimeter frame 28, but be controllable by drive system 38 for a range of extension and retraction so that at maximum extension, the total length of arm 36 again does not exceed the length of the perimeter frame 28. Leaving some overlap between stationary arm 50 and mobile arm 52 at maximum extension may tend to increase the structural stability and rigidity of arm 36, thereby reducing the likelihood of failure under the weight of body portion 20.

With either arrangement, however, even at maximum extension of mobile arm 52 out from stationary arm 50, arm 36 may still be accommodated within the interstitial space between perimeter frame 28 and surface mounts 16, 18. For example, the lateral width of actuator 34 may be accommodated by the spacing of side legs 10, while the length of actuator 34 at any position or state of extension/retraction may be accommodated by the spacing of transverse bridges 32. Consequently, throughout the entire range of motion of body portion 20, it may be that at no time is any part of actuator 34 visible when support assembly 10 is viewed at least from a head-on perspective (i.e., the perspective shown in FIGS. 1A and 1B) as well as a range of other viewing angles.

Figure 3A:
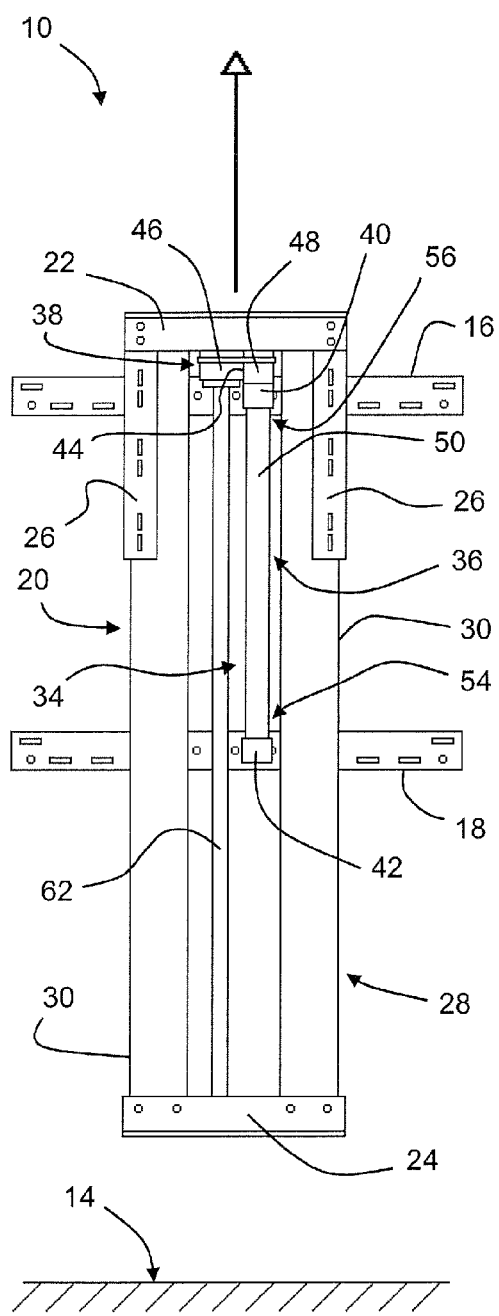
FIGS. 3A and 3B show front views of an embodiment of a support assembly, in lowered and raised positions, respectively, to illustrate operation thereof.
Figure 3B:
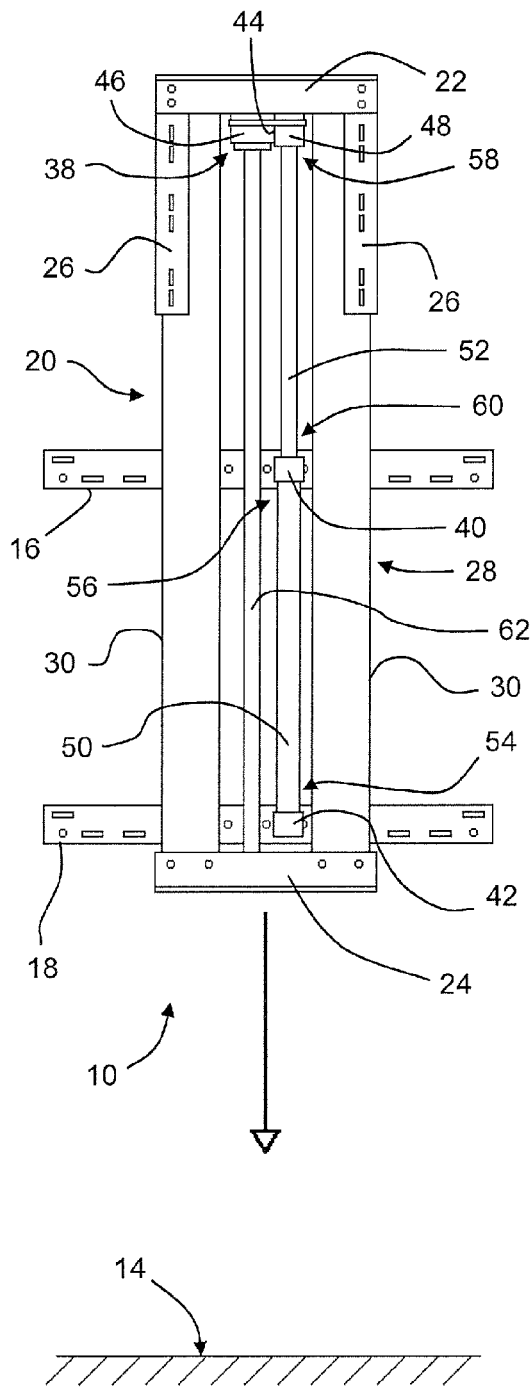

Referring now to FIGS. 3A and 3B, when in operation, body portion 20 can be seen to be movable through a range of motion, for example, but not necessarily limited to, a linear range of movement. Thus, in FIG. 3A, support assembly 10 is depicted with arm 36 in a fully retracted position or state, in which mobile arm portion 52 is received into stationary arm portion 50 to a maximum depth. Because body portion 20 is supported on arm 36 (e.g., at anchor 48) free of other stationary points in support assembly 10, such as surface mounts 16, 18, when arm 36 is at maximum retraction, body portion 20 correspondingly achieves a first extreme position. Given the generally vertical orientation of support assembly in FIG. 3A, such extreme position of body portion 20 corresponds to a minimum height or clearance relative to floor 14. However, with different possible orientations, the extreme position of body portion 20 when arm 36 is at maximum retraction may not always correspond to a minimum height or clearance.

In FIG. 3B, support assembly 10 is depicted now with arm 36 in a fully extended position or state, in which mobile arm portion 52 has transitioned out of stationary arm portion 50 to a maximum extent. As can be seen, extension of arm 36 carries body portion 20 through a range of positions, starting from the extreme position achieved when arm 36 is fully retracted to a second extreme position when arm 36 is now fully extended. Consistent with the FIG. 3A depiction, the extreme position shown in FIG. 3B corresponds (although not necessarily) to a maximum height or clearance of body portion 20 relative to floor 14. Through control of arm 36 via drive system 38, any general position of body portion 20 within the range defined by the two extreme positions shown may be achieved (subject potentially to control limitations and/or other practical effects, such as motor precision, which may be introduced by drive system 38).

In some embodiments, therefore, drive system 38 may be controllable for arbitrary positioning of body portion 20 within the range of motion of arm 36. Such control may be achieved using suitably configured control circuits and systems formed out of combinations of hardware, software, and/or firmware, including feedback control, set point control or the like. Thus, drive system 38 may be controllable so that a user may select desired height or position for body portion 20 using an input device, to which drive system 38 will respond by actuating arm 36 until body portion 20 has attained approximately the selected position or height. The available controls may include different commands, whether manual or automatic, such as 'raise', 'lower', 'move to location', and 'hold' commands. The input device operated by the user is not generally limited and may include any switches, buttons, or controls as the case may be, including remotely operated control devices that communicate wirelessly with drive system 38.

In some embodiments, as illustrated in FIGS. 3A and 3B, support assembly 10 may be orientated so that mobile arm portion 52 of arm 36 extends vertically or generally vertically upwards of stationary arm portion 50. Anchor 48 (which couples mobile arm portion 52 to perimeter frame 28 of body portion 20) may also be positioned vertically or generally vertically upwards of stationary arm portion 50, as well as other stationary points fixedly attached thereto, such as surface mounts 16, 18. Therefore, because body portion 20 is supported on arm 36 free of other stationary points in support assembly 10, in such configurations, the gravitational force body portion 20 exerts on arm 36 may cause arm 36 to experience a constant or nearly constant compressive (as opposed to tensile) force. Such compressive force may be experienced whether arm 36 is in an extended or retracted state, as well as during periods of operation when transitioning between states. As noted, compressive forces may confer one or more advantages, such as stability, robustness and controllability, in comparison to tensile forces.

In some embodiments, support assembly 10 may further include a reinforcement arm 62 running longitudinally of body portion 20, laterally between the pair of spaced apart legs 30 and adjacent to arm 36. Thus, reinforcement arm 62 and actuator 34 may each be accommodated within the interior or interstitial space defined by perimeter frame 28. As seen, reinforcement arm 62 may couple lower transverse bridge 32 to drive system 38, which may also be coupled to upper transfer bridge 32, thereby acting to stabilize drive system 38 within support assembly 10 as well as adding structural integrity to perimeter frame 28. Reinforcement arm 62 may provide body portion 20 and perimeter frame 28 with additional structural stability, while also being generally concealed from view behind any mounted storage unit(s) over a range of possible viewing angles. However, some embodiments of a support assembly 10 may not include reinforcement arm 62.

Referring back to FIGS. 1B and 2B, some embodiments of support assembly 10 may further include a strain gauge 64 installed in a terminal region 66 of body portion 20. As shown, when support assembly 10 has a vertical or generally vertical orientation, terminal region 66 may be located toward the lower end of body portion 20 that is nearest to floor 14 below. However, other relative locations for strain gauge 64 in support assembly 10 may also be possible in alternative embodiments.

Strain gauge 64 may be in electronic communication with the drive system 38 of actuator 34 and configured to measure and/or monitor (more generally "detect") a strain force acting on body portion 20 in the terminal region 66. Thus, for example, strain gauge 64 may be coupled between body portion 20 (e.g., by way of transverse bridge 32) and bracket 24. In this location, strain gauge 64 is able to measure, for example, the strain force generated within terminal region 66 as a result of contact force(s) exerted by bracket 24 (onto which loads, such as storage units, may be mounted).

Depending on the net forces acting on bracket 24, different levels of strain force may be experienced by body portion 20. Thus, for example, heavier loads mounted onto bracket 24 may tend to generate more strain in body portion 20 than would be generated by comparatively lighter loads. But, in addition, any countervailing forces applied to bracket 24, such as might be applied when bracket 24 encounters an obstruction or other object that pushes back up onto bracket 24, the amount of strain force experienced by terminal region 66 may change accordingly.

Thus, strain gauge 64 in conjunction with drive system 38 may operate to provide a feedback mechanism for obstruction detection and mediation during operation of support assembly 10. For example, strain gauge 64 may be configured to detect changes in the strain force acting on the body portion 20 in the terminal region 66. Such detection may occur on different timescales including continuous detection, as well as semi-continuous or discontinuous detection, such as periodically or asynchronously. Based on the detected changes in strain force, drive system 38 of actuator 34 (which is in electronic communication with strain gauge 64 to receive data sets and/or streams representing the detected strain forces) may then initiate automated control of the movement of body portion 20. Where the change in the detected strain force is due to body portion 20 encountering an obstruction during periods of operation, drive system 38 may thereby respond to and mediate the obstruction with an appropriate control response, so that any damage to the encountered object or to support assembly 10 may be avoided or at least mitigated.

As part of a feedback mechanism for obstruction detection and mediation, the location of strain gauge 64 in the terminal region 66 of body portion 20 (as depicted in FIGS. 1B and 2B) may allow for greater sensitivity of measurement and consequently a quicker control response. For example, within the terminal region 66, smaller changes in strain force may be detected in relation to other areas of body portion 20, which may in turn allow for quicker a response time by drive system 38 to mediate the obstruction. With less precise strain change measurement, it may take longer for strain gauge 64 to register a change that is interpreted as being caused by an obstruction. Having a quicker control response may advantageously tend to lessen any damage caused to an obstruction during operation of support assembly 10 by adjusting the movement of body portion 20 in a shorter period of time.

Referring now to FIG. 4, there is illustrated a method 400 of controlling movement of a position-adjustable support assembly, such as assembly 10 shown in FIGS. 1-3. According to the described embodiments, method 400 may be utilized, for example, to override user control of a support assembly and instead to control movement of the support assembly in such a way that an encountered obstruction to the movement of the support assembly is detected and automatically mediated.

Thus, in 405, movement of a body portion (e.g., 20) of a support assembly is initiated. For example, such movement may be user-initiated and may, in some cases, include movement of the body portion in a generally downward direction. At 410, a strain force acting on a terminal region (e.g., 66) of the body portion is detected. As described herein, a suitably configured and located strain gauge (e.g., 64) may be utilized to detect such strain forces. Different approaches to strain detection may be possible, such as continuous, periodical or asynchronous detection, without limitation.

At 415, the detected strain force is compared against a threshold value. If the detected strain force does not exceed the threshold value (indicating that no obstruction has been encountered), then method 400 may branch back to 410 and strain force may continue to be detected while movement of the body portion continues as initiated. So long as no obstruction is encountered, method 400 may therefore remain in a loop comprising 410 and 415, in which case movement of the support assembly may proceed as controlled by the user until a final or selected position has been reached. In such cases, method 400 may end as no obstruction is encountered.

For detecting the presence of an obstruction, it may be possible to use different threshold values in the comparison performed at 415. For example, in some cases, the threshold value may be defined as a minimum change or negative delta in the detected strain force. Because obstructions may tend to exert a countervailing (upward) force on the support assembly that will partially negate the downward force exerted by a mounted load, a sufficiently large decrease in detected strain force in the terminal region may be interpreted to indicate that an obstruction has been encountered. In some cases, the magnitude of the threshold value may also be varied based on the desired sensitivity of the detection. Other definitions of the threshold value are possible as well. For example, absolute strain forces as well as baseline deviations may each by used as a threshold value in the comparison at 415.

However, if the comparison at 415 indicates that the detected strain force has exceeded the threshold value (corresponding to a positive determination of an obstruction), then method 400 may break from the loop comprised of 410 and 415 and branch forward to 420 in which movement of the body portion may be terminated. In some cases, termination of movement in 420 may override continued user request for movement in the initiated direction. Continued user request despite an obstruction may occur, for example, if the user operating the support assembly does not themselves perceive the obstruction or perhaps does not react fast enough to manually request a control adjustment with the user input device.

Optionally, at 425, after an obstruction has been detected in 415 and movement of the support assembly terminated in 420, additional controlled movement of the support assembly may be initiated as part of the feedback mechanism. For example, in some cases, after detection of the strain force exceeding the threshold value, movement of the support assembly in a reverse direction may be initiated in order to back the support assembly off from the encountered obstruction. Such reverse movement may be a predetermined incremental distance in the reverse direction. Alternatively, reverse movement may be automatically controlled until a strain force back below the threshold level is detected (which would indicate to the drive system that the support assembly has been backed off the obstruction), after which point the support assembly may again be brought to rest.

Figure 5:
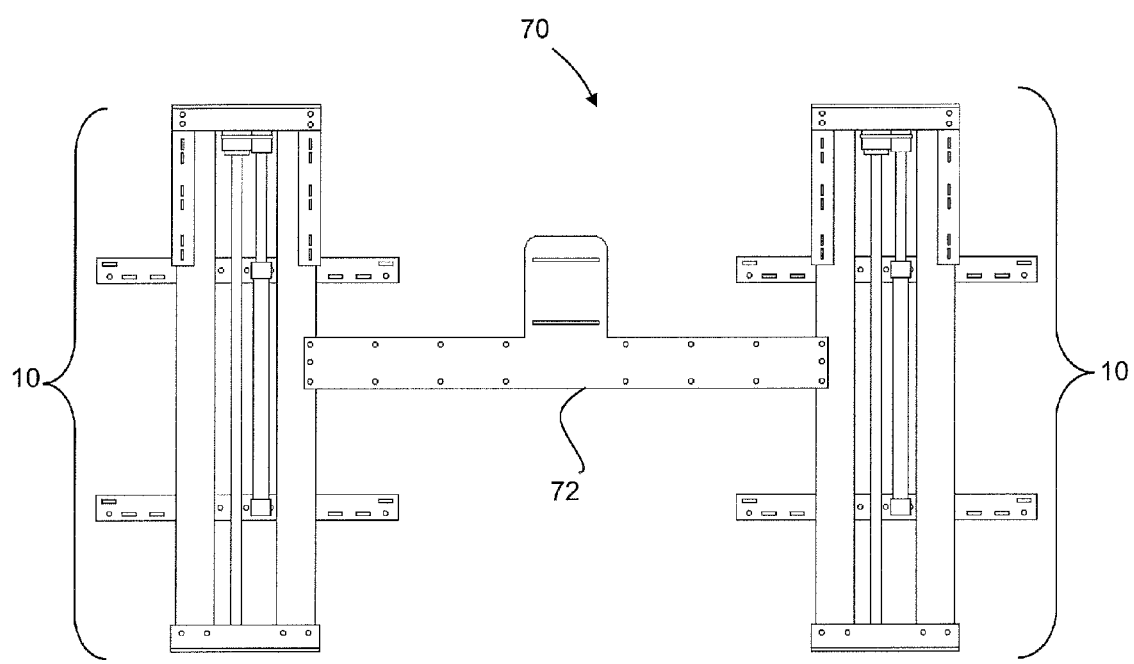
FIG. 5 shows a front view of an alternative embodiment of a support assembly in an intermediate position between fully raised and fully lowered.

Referring now to FIG. 5, there is shown an alternative embodiment of a support assembly, denoted generally by 70, according to the invention(s) set forth and described herein. As seen, support assembly 70 may be a compound assembly formed out of two support assemblies 10 tied together using a neck 72. Each of the support assemblies 10 may have a configuration as described above with reference to FIGS. 1-3 and, for brevity and clarity of description, will not be described further. Neck 72 may be any rigid body or plate that fastens together support assemblies 10 and provides additional structural stability for mounting storage(s) units to support assembly 70. For example, metal or composite material plates having a low or generally flat profile may be suitable.

In contrast to support assembly 10, support assembly 70 may have a relatively large lateral (or horizontal) aspect or dimension. Thus, while the configuration of support assembly 10 may be suitable for single-stack storage unit(s), the configuration of support assembly 70 may be more suitable for hybrid arrangements of storage unit(s), such as multiple-stack configurations or configurations in which cabinets are combined with, or for any other configuration having a similarly large lateral aspect. While support assembly 70 shows two separate assemblies 10 connected by neck 72, other sizes and configurations of a support assembly 70 are possible as well. For example, configurations incorporating different numbers of support assemblies 10 and/or necks 72 are possible. The possible configurations may depend at least partly on the dimensionalities of the storage units to be mounted.

The above description is intended to provide a thorough description of various aspects and example embodiments of one or more inventions. Accordingly, various aspects and/or components of such invention(s) have been described throughout at multiple different levels of abstraction. In some instances, embodiments may have been described on both a specific and a relatively general or generic level, for example, where an aspect or component of the embodiment is susceptible to variation in a manner that is not inconsistent with the specific structure(s) and/or operation(s) set forth. In these instances, the specific embodiments set forth herein may not be the only ones contemplated and instead may only be exemplary of a more general or generic configuration. The scope of the invention(s) described herein is therefore defined solely by the language of the claims appended hereto, giving due consideration to applicable doctrines for construing their meaning.

The invention claimed is:

1. A position-adjustable support assembly, comprising:
   at least one surface mount;
   an actuator affixed to the at least one surface mount; and
   a body comprising a frame portion coupled to and supported on the actuator free of the at least one surface mount, wherein the body, in response to a motive force applied by the actuator, is moveable relative to the at least one surface mount;
   wherein the actuator is affixed to the at least one surface mount inboard of an outer perimeter defined by the frame portion so as to be accommodated interstitially between the at least one surface mount and the body, the actuator comprising an arm affixed to each of the body and the at least one surface mount; and a drive system operatively coupled to the arm and controllable so as to move the arm between retracted and extended positions, extension and retraction of the arm inducing movement of the body relative to the at least one surface mount; and
   wherein the arm comprises a stationary arm portion fixedly attached to the at least one surface mount; and a mobile arm portion movably supported by the stationary arm portion, the mobile arm portion coupled to the body and moveable in relation to the stationary arm portion through operative coupling with the drive system, movement of the mobile arm portion relative to the stationary arm portion causing movement of the body relative to the at least surface mount.

2. The assembly of claim 1, wherein the stationary and mobile arm portions are supported within the actuator in collinear alignment, the mobile arm portion accommodated within the stationary arm portion.

3. The assembly of claim 2, wherein extension and retraction of the mobile arm portion out of and into the stationary arm portion exerts a contact force on the body inducing generally linear movement.

4. The assembly of claim 1, wherein the stationary and mobile arm portions are arranged to move the body through application of a contact force while remaining in a constant state of compression.

5. The assembly of claim 1, wherein the frame portion of the body comprises a pair of spaced apart legs.

6. The assembly of claim 5, wherein the arm of the actuator is supported on the at least one surface mount between the spaced apart legs of the frame portion.

7. The assembly of claim 6, wherein the arm of the actuator is oriented generally parallel to the spaced apart legs of the frame portion.

8. The assembly of claim 5, wherein the length of the arm when the mobile arm portion is fully extended out of the stationary arm portion is less than the length of the pair of spaced apart legs.

9. The assembly of claim 5, wherein the frame portion of the body further comprises at least one transverse bridge fixing the pair of legs in spaced apart relation.

10. The assembly of claim 9, wherein the mobile arm portion is coupled to the body at the at least one transverse bridge.

11. The assembly of claim 10, wherein a distal end portion of the mobile arm portion is movably received into the stationary arm portion so as to be extendible and retractable.

12. The assembly of claim 11, wherein the stationary arm portion of the actuator is fixed across the at least two surface mounts.

13. The assembly of claim 9, wherein a proximal end portion of the mobile arm portion is coupled to the at least one transverse bridge.

14. The assembly of claim 1, wherein the at least one surface mount comprises at least two spaced-apart surface mounts.

15. The assembly of claim 1, further comprising at least one bracket supported on the body for mounting a physical storage component.

16. The assembly of claim 1, wherein the drive system comprises an electric motor.

17. A position-adjustable support assembly, comprising:
at least one surface mount;
an actuator fixedly secured to the at least one surface mount;
a body coupled to and supported on the actuator free of the at least one surface mount, wherein the body, in response to a motive force applied by the actuator, is moveable relative to the at least one surface mount; and
a strain gauge coupled to the body at a terminal region thereof, the strain gauge configured to detect a strain force acting on the body in the terminal region;
wherein the actuator is in communication with the strain gauge and configured, when operative, to control movement of the body based on the strain force detected by the strain gauge.

18. The assembly of claim 17, wherein the strain gauge is configured to detect at least a minimum deviation from a baseline level in the strain force acting on the body in the terminal region.

19. The assembly of claim 18, wherein the actuator is configured to terminate movement of the body when the strain gauge detects at least the minimum deviation in the strain force.

20. The assembly of claim 19, wherein the actuator is further configured, when the strain gauge detects at least the minimum deviation in the strain force, to initiate movement of the body in a reverse direction to the movement that is terminated.

21. The assembly of claim 20, wherein the actuator is further configured, when the strain gauge detects at least the minimum deviation in the strain force, to move the body through a predetermined incremental distance in the reverse direction.

22. The assembly of claim 20, wherein the actuator is further configured, when the strain gauge detects at least the minimum deviation in the strain force, to move the body in the reverse direction until the strain force detected by the strain gauge returns to the baseline level.

23. A method of controlling movement of a position-adjustable support assembly, the method comprising:
initiating movement of a body portion of the position-adjustable support assembly, the movement relative to at least one stationary anchor point;
detecting a strain force acting on a terminal region of the body portion; and
controlling movement of the body portion based on the strain force detected in the terminal region.

24. The method of claim 23, wherein detecting the strain force comprises detecting at least a minimum deviation from a baseline level in the strain force acting on the terminal region of the body portion.

25. The method of claim 24, wherein controlling the movement of the body portion comprises terminating movement of the body portion when at least the minimum deviation in the strain force is detected.

26. The method of claim 25, wherein controlling the movement of the body portion further comprises, when the at least the minimum deviation in the strain force is detected, initiating movement of the body portion in a reverse direction to the movement that is terminated.

27. The method of claim 26, wherein controlling the movement of the body portion further comprises, when the at least the minimum deviation in the strain force is detected, moving the body portion through a predetermined incremental distance in the reverse direction.

28. The method of claim 26, wherein controlling the movement of the body portion further comprises, when the minimum deviation in the strain force is detected, moving the body portion in the reverse direction until detecting that the strain force acting on the terminal region of the body portion returns to the baseline level.

\* \* \* \* \*